United States Patent
Tung et al.

(10) Patent No.: US 12,021,986 B2
(45) Date of Patent: Jun. 25, 2024

(54) NEURAL NETWORK PROCESSING METHOD AND SERVER AND ELECTRICAL DEVICE THEREFOR

(71) Applicant: INDUSTRIAL TECHNOLOGY RESEARCH INSTITUTE, Hsinchu (TW)

(72) Inventors: Ming-Chih Tung, Taoyuan (TW); Hsin-Lung Wu, Taoyuan (TW); Juin-Ming Lu, Hsinchu (TW); Bo-Xuan Zhu, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 392 days.

(21) Appl. No.: 17/562,700

(22) Filed: Dec. 27, 2021

(65) Prior Publication Data
US 2023/0208639 A1   Jun. 29, 2023

(51) Int. Cl.
*H04L 9/32*   (2006.01)
*G06F 8/41*   (2018.01)
*G06N 3/063*   (2023.01)

(52) U.S. Cl.
CPC ........... *H04L 9/32* (2013.01); *G06F 8/41* (2013.01); *G06N 3/063* (2013.01)

(58) Field of Classification Search
CPC . H04L 9/32; H04L 9/0894; H04L 9/38; G06F 8/41; G06F 30/327; G06N 3/063;
(Continued)

(56) References Cited

U.S. PATENT DOCUMENTS

| | | | | |
|---|---|---|---|---|
| 8,379,841 B2* | 2/2013 | Taylor | .............. | H04L 9/0637 380/37 |
| 8,762,736 B1* | 6/2014 | Goldwasser | .......... | G06F 21/556 235/382 |

(Continued)

FOREIGN PATENT DOCUMENTS

| CN | 110766147 A | 2/2020 |
|---|---|---|
| CN | 111045688 A | 4/2020 |

(Continued)

OTHER PUBLICATIONS

Boulemtafes et al., "A Review of Privacy-Preserving Techniques for Deep Learning", Neurocomputing, Elsevier, 2020, 384, pp. 21-45. 10.1016/j.neucom.2019.11.041. hal-02921443.
(Continued)

*Primary Examiner* — Aravind K Moorthy
(74) *Attorney, Agent, or Firm* — Birch, Stewart, Kolasch & Birch, LLP

(57) ABSTRACT

A neural network (NN) processing method is provided. An AI (artificial intelligence) compiler code of an AI compiler is transformed to a garbled circuit code by performing following steps. A circuit graph of a garbled circuit having logic gates corresponding to the garbled circuit code is sent to an electrical device by a server. Key codebooks for candidate gates corresponding to each logic gate are creating by the electrical device. Garbled truth tables for the candidate gates corresponding to each logic pate are generated and transmitted to the server by the electrical device through using OT (Oblivious Transfer) protocol. A target garbled truth table of each logic gate is generated by the server. Afterward, an NN model is encrypted according to the key codebooks by the electrical device and a compiled NN model of an encrypted NN model are generated by the server.

20 Claims, 15 Drawing Sheets

US 12,021,986 B2
Page 2

(58) Field of Classification Search
CPC ........ G06N 3/044; G06N 3/045; G06N 3/047; G06N 3/048; G06N 3/08; G06N 3/04; G09C 3/00; Y02D 10/00
See application file for complete search history.

(56) References Cited

U.S. PATENT DOCUMENTS

| | | | | |
|---|---|---|---|---|
| 8,879,727 | B2* | 11/2014 | Taylor | H04L 9/0618 380/42 |
| 10,630,478 | B1* | 4/2020 | Yavuz | H04L 9/321 |
| 10,664,621 | B1* | 5/2020 | Dropps | G06F 21/44 |
| 10,956,584 | B1* | 3/2021 | Heaton | G06F 9/3802 |
| 11,023,595 | B1* | 6/2021 | Allen | G06F 16/248 |
| 11,328,087 | B1* | 5/2022 | Allen | G06F 21/602 |
| 11,880,650 | B1* | 1/2024 | Li | G06F 40/174 |
| 2005/0037733 | A1* | 2/2005 | Coleman | H04L 63/1416 455/411 |
| 2011/0216902 | A1* | 9/2011 | Kolesnikov | H04L 9/0631 380/47 |
| 2014/0372769 | A1* | 12/2014 | Kerschbaum | H04L 9/008 713/189 |
| 2018/0268283 | A1* | 9/2018 | Gilad-Bachrach | G06F 17/18 |
| 2019/0007196 | A1* | 1/2019 | Malluhi | H04L 9/008 |
| 2019/0199509 | A1* | 6/2019 | Hoshizuki | G06N 3/048 |
| 2019/0296910 | A1* | 9/2019 | Cheung | H04L 9/008 |
| 2019/0303504 | A1* | 10/2019 | Pasumarthy | G06N 3/08 |
| 2019/0361917 | A1* | 11/2019 | Tran | H04W 12/108 |
| 2019/0392305 | A1* | 12/2019 | Gu | G06F 21/53 |
| 2020/0036510 | A1* | 1/2020 | Gomez | H04L 9/008 |
| 2020/0082273 | A1 | 3/2020 | Rossi et al. | |
| 2020/0117690 | A1* | 4/2020 | Tran | G06F 16/90332 |
| 2020/0167484 | A1* | 5/2020 | Linton | G06F 8/41 |
| 2020/0175205 | A1* | 6/2020 | Kramer | G06N 20/00 |
| 2020/0177364 | A1* | 6/2020 | Zhou | G06N 20/00 |
| 2020/0226459 | A1* | 7/2020 | Chen | G06N 3/045 |
| 2020/0233979 | A1 | 7/2020 | Tahmasebi Maraghoosh et al. | |
| 2020/0234121 | A1* | 7/2020 | Stapleton | G06N 3/02 |
| 2020/0242465 | A1 | 7/2020 | Krishnan et al. | |
| 2020/0242466 | A1 | 7/2020 | Mohassel et al. | |
| 2020/0313849 | A1* | 10/2020 | Kar | G06N 3/08 |
| 2020/0328882 | A1* | 10/2020 | Hoshizuki | H04L 9/0643 |
| 2020/0374101 | A1* | 11/2020 | Hoshizuki | H04L 9/0618 |
| 2020/0394316 | A1* | 12/2020 | Boehler | G06F 21/6245 |
| 2020/0410404 | A1* | 12/2020 | Imani | H04L 9/085 |
| 2021/0014039 | A1* | 1/2021 | Zhang | H04L 9/0618 |
| 2021/0014205 | A1* | 1/2021 | Montoya | G06N 7/01 |
| 2021/0073393 | A1* | 3/2021 | Jacobson | G06F 21/602 |
| 2021/0083865 | A1* | 3/2021 | Obadia | H04L 9/0858 |
| 2021/0097395 | A1* | 4/2021 | Ocher | G06N 3/063 |
| 2021/0133587 | A1* | 5/2021 | Mohassel | G06N 20/00 |
| 2021/0135837 | A1* | 5/2021 | Cheung | H04L 9/008 |
| 2021/0166152 | A1* | 6/2021 | Gomez | G06F 21/6245 |
| 2021/0209247 | A1* | 7/2021 | Mohassel | A63B 21/023 |
| 2021/0211291 | A1* | 7/2021 | Jindal | H04L 9/3231 |
| 2021/0241806 | A1 | 8/2021 | Chawla et al. | |
| 2021/0263904 | A1* | 8/2021 | Kapinos | H04L 9/0618 |
| 2021/0271963 | A1* | 9/2021 | Amisano | G06N 3/08 |
| 2021/0374271 | A1* | 12/2021 | Hung | G06N 3/08 |
| 2021/0375008 | A1* | 12/2021 | Hassan | H04N 19/20 |
| 2021/0403004 | A1* | 12/2021 | Alvarez | H04W 4/40 |
| 2022/0038271 | A1* | 2/2022 | Ranellucci | H04L 9/0819 |
| 2022/0046126 | A1* | 2/2022 | Grabowski | H04M 3/436 |
| 2022/0101160 | A1* | 3/2022 | Chen | G06N 20/00 |
| 2022/0138284 | A1* | 5/2022 | Lee | G06N 3/063 713/193 |
| 2022/0138286 | A1* | 5/2022 | Zage | H04L 63/0428 726/26 |
| 2022/0206958 | A1* | 6/2022 | LeMay | G06F 12/0831 |
| 2022/0366059 | A1* | 11/2022 | Sasidharan Rajalekshmi | G06F 17/141 |
| 2022/0374519 | A1* | 11/2022 | Botelho | G06F 9/45558 |
| 2022/0405474 | A1* | 12/2022 | Seo | G06F 40/216 |
| 2023/0004872 | A1* | 1/2023 | Ghose | G06N 3/098 |
| 2023/0050481 | A1* | 2/2023 | Nagaraja | H04L 9/0894 |
| 2023/0087777 | A1* | 3/2023 | Sha | G06N 3/084 706/26 |
| 2023/0094940 | A1* | 3/2023 | Madhavan | G06V 10/751 706/15 |
| 2023/0134515 | A1* | 5/2023 | Mukai | H04L 9/3242 713/155 |
| 2023/0161919 | A1* | 5/2023 | Leobandung | G01R 31/2831 726/34 |
| 2023/0177489 | A1* | 6/2023 | Chan | G06Q 20/3672 705/66 |

FOREIGN PATENT DOCUMENTS

| | | | | |
|---|---|---|---|---|
| CN | 109684855 | B | 7/2020 | |
| CN | 111967038 | A | 11/2020 | |
| CN | 112016086 | A | 12/2020 | |
| CN | 112334917 | A | 2/2021 | |
| CN | 112949741 | A | 6/2021 | |
| CN | 113177209 | A | 7/2021 | |
| TW | M565371 | U | 8/2018 | |
| TW | I724809 | B | 4/2021 | |
| WO | WO-2020151964 | A1 * | 7/2020 | ........... G06F 21/554 |

OTHER PUBLICATIONS

Chen et al., "Deep Learning With Edge Computing: A Review", Proceedings of the IEEE, vol. 107, No. 8, Aug. 2019, 21 pps.
Emmanuel et al., "Privacy-Preservation in Distributed Deep Neural Networks via Encryption of Selected Gradients", 2020 IEEE 22nd International Conference on HPCC; IEEE 18th International Conference Smart City; IEEE 6th International Conference on DSS, 8 pps.
Hao et al., "Towards Efficient and Privacy-preserving Federated Deep Learning", 2019 IEEE, 6 pps.
Liu et al., "DataMix: Elcient Privacy-Preserving Edge-Cloud Inference", this paper has been published at ECCV 2020, 17 pps.
Wirth, "Hardware Compilation: Translating Programs into Circuits", Cybersquare, IEEE, Jun. 1998, 7 pps.
Zhang et al., "Privacy-Preserving Deep Learning Based on Multiparty Secure Computation: A Survey", IEEE Internet of Things Journal, vol. 8, No. 13, Jul. 1, 2021, 18 pps.
Taiwanese Office Action and Search Report for Taiwanese Application No. 110148953, dated Jul. 13, 2022.

* cited by examiner

| Truth table of AND gate | | |
|---|---|---|
| x | y | z |
| 0 | 0 | 0 |
| 0 | 1 | 0 |
| 1 | 0 | 0 |
| 1 | 1 | 1 |

| Encrypted truth table (Garbled truth table) of AND gate |
|---|
| $E_{k_{0x}}(E_{k_{0y}}(k_{0z}))$ |
| $E_{k_{0x}}(E_{k_{1y}}(k_{0z}))$ |
| $E_{k_{1x}}(E_{k_{0y}}(k_{0z}))$ |
| $E_{k_{1x}}(E_{k_{1y}}(k_{1z}))$ |

NEURAL NETWORK PROCESSING METHOD AND SERVER AND ELECTRICAL DEVICE THEREFOR

TECHNICAL FIELD

The disclosure relates in general to neural network (NN) processing method and server and electrical device therefor.

BACKGROUND

With the development of technology, more and more attention has been paid to related applications of AI (artificial intelligence). Most frameworks for AI only support CPU and GPU hardware environments. AI compiler (neural network compiler) can make neural network (NN) models to be executed on different types of hardware, such as mobile phones, embedded system devices, low-power special purpose chips, and so on.

The AI compiler can be implemented in cloud services. Model developers only need to upload the NN model, and then the AI compiler in cloud can optimize, benchmark, and package the models for different hardware platforms. The compiled NN model can be transmitted to AI SoC (System on a Chip) or AI dongle (such as USB AI dongle) for execution, or be executed on other different hardware platforms.

However, this approach of implementing the AI compiler in cloud services makes the NN model lack of privacy. When NN models developed with different frameworks are transmitted to the cloud for compilation, the NN models may be known by others. Excellent NN models are often important property of a company. If NN models are released to others, it may cause significant loss to the company. Therefore, how to properly protect the NN model developed by the model developer when the NN models are uploaded to the cloud has become a prominent task for the industries.

SUMMARY

According to one embodiment, a neural network (NN) processing method is provided. The method includes the following steps. An AI (artificial intelligence) compiler code of an AI compiler is transformed to a garbled circuit code by sending a circuit graph of a garbled circuit corresponding to the garbled circuit code to a first electrical device by a server, the garbled circuit having a number of logic gates; creating a number of key codebooks for a number of candidate gates corresponding to each logic gate by the first electrical device; generating a number of garbled truth tables for the candidate gates corresponding to each logic gate by the first electrical device; transmitting the garbled truth tables for the candidate gates corresponding to each logic gate to the server by the first electrical device through using OT (Oblivious Transfer) protocol; and obtaining a target garbled truth table of each logic gate through using OT protocol based on the garbled truth tables for the candidate gates corresponding to each logic gate by the server. The neural network processing method further includes the step of encrypting an NN model according to the key codebooks by the first electrical device and generating a compiled NN model of an encrypted NN model according to the garbled circuit code with the target garbled truth table of each logic gate by the server.

According to another embodiment, a server for processing a neural network is provided. The server includes a transmission circuit and a processor. The processor is configured to transform an AI compiler code of an AI compiler to a garbled circuit code by performing following procedures: sending a circuit graph of a garbled circuit corresponding to the garbled circuit code to a first electrical device through the transmission circuit, the garbled circuit having a number of logic gates; receiving a number of garbled truth tables for a number of candidate gates corresponding to each logic gate from the first electrical device through using OT protocol via the transmission circuit; and obtaining a target garbled truth table of each logic gate through using OT protocol based on the garbled truth tables for the candidate gates corresponding to each logic gate. A number of key codebooks for the candidate gates corresponding to each logic gate are created by the first electrical device, an NN model is encrypted according to the key codebooks by the first electrical device, and the processor is further configured to generate a compiled NN model of an encrypted NN model according to the garbled circuit code with the target garbled truth table of each logic gate.

According to an alternative embodiment, an electrical device for processing a neural network is provided. The electrical device includes a transmission circuit and a processor. The processor is configured to assist a server to transform an AI compiler code of an AI compiler to a garbled circuit code by performing following procedures: receiving a circuit graph of a garbled circuit corresponding to the garbled circuit code from the server through the transmission circuit, the garbled circuit having a number of logic gates; creating a number of key codebooks for a number of candidate gates corresponding to each logic gate; generating a number of garbled truth tables for the candidate gates corresponding to each logic gate; and transmitting the garbled truth tables for the candidate gates corresponding to each logic gate to the server through using OT protocol via the transmission circuit. The processor is further configured to encrypt an NN model according to the key codebooks, a target garbled truth table of each logic gate is obtained through using OT protocol based on the garbled truth tables for the candidate gates corresponding to each logic gate by the server, and a compiled NN model of an encrypted NN model is generated according to the garbled circuit code with the target garbled truth table of each logic gate by the server.

Figure 1:
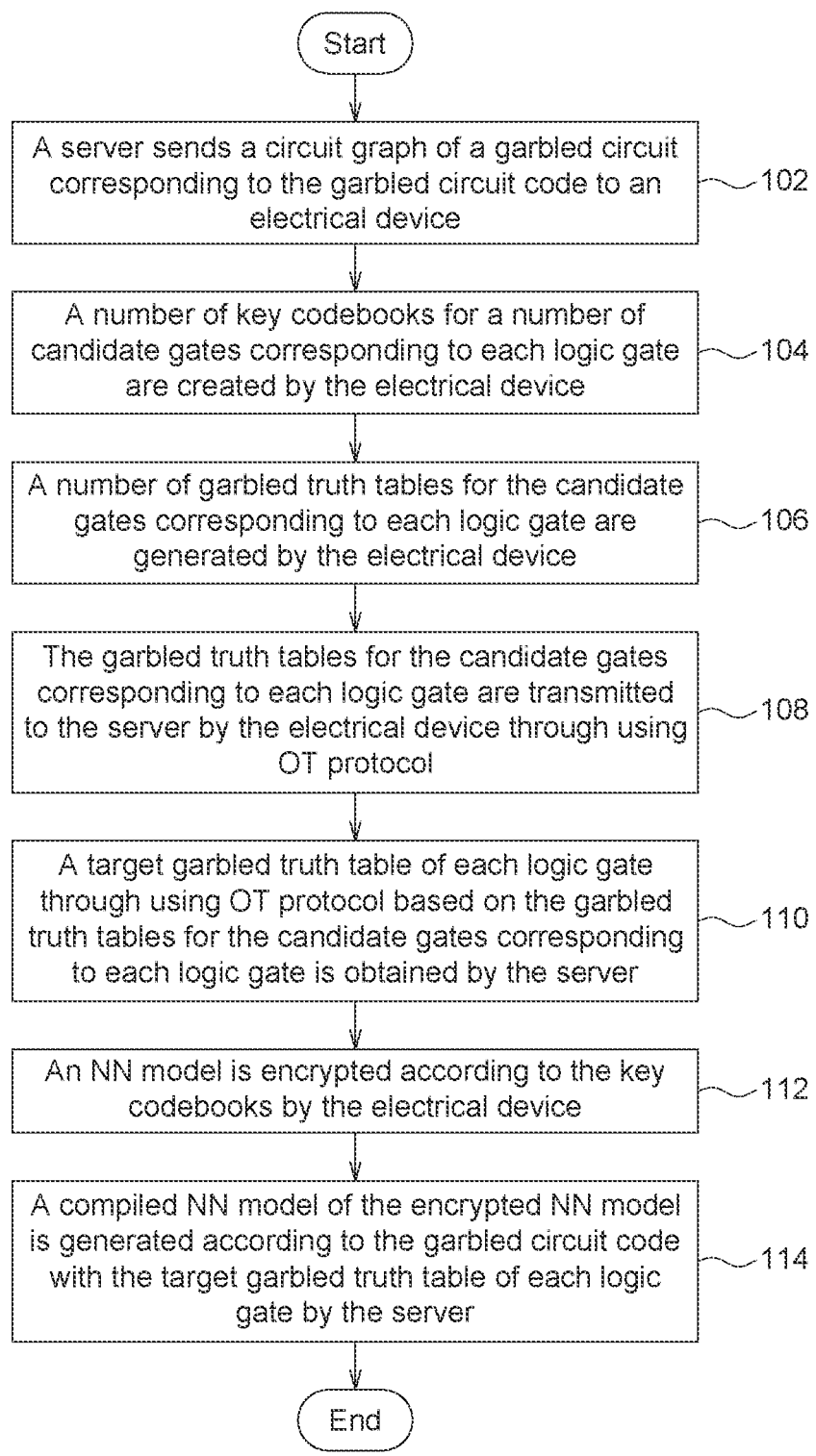
FIG. 1 illustrates the flowchart of a neural network (NN) processing method according to the embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Figure 2:
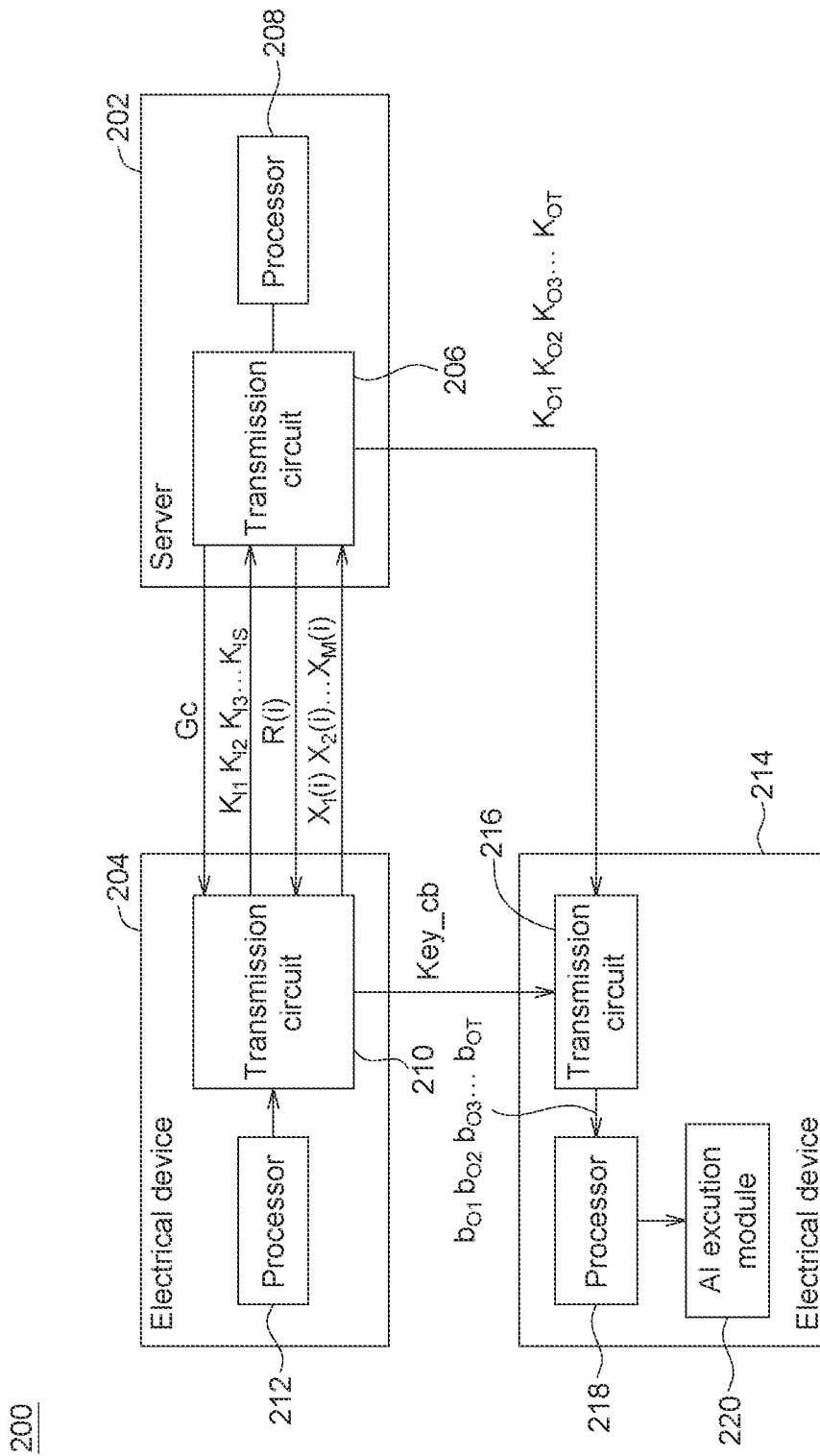
FIG. 2 illustrates the block diagram of the system for processing the neural network.

Referring to FIG. 1 and FIG. 2, FIG. 1 illustrates the flowchart of a neural network (NN) processing method according to the embodiment of the disclosure, and FIG. 2 illustrates the block diagram of the system for processing the neural network. The neural network processing method includes the following steps. First, an AI (artificial intelligence) compiler code of an AI compiler is transformed to a garbled circuit code by performing steps 102 to 110. In step 102, a server 202 sends a circuit graph Gc of a garbled circuit corresponding to the garbled circuit code to an electrical device 204. The garbled circuit has a number of logic gates. In step 104, a number of key codebooks for a number of candidate gates corresponding to each logic gate are created by the electrical device 204. In step 106, a number of garbled truth tables for the candidate gates corresponding to each logic gate are generated by the electrical device 204. In step 108, the garbled truth tables for the candidate gates corresponding to each logic gate are transmitted to the server 202 by the electrical device 204 through using OT (Oblivious Transfer) protocol. In step 110, a target garbled truth table of each logic gate through using OT protocol based on the garbled truth tables for the candidate gates corresponding to each logic gate is obtained by the server 202.

Afterward, the method enters to step 112, an NN model is encrypted according to the key codebooks by the electrical device 204. Then, step 114 is performed and a compiled NN model of an encrypted NN model is generated according to the garbled circuit code with the target garbled truth table of each logic gate by the server 202.

The electrical device 204 operates as, for example, a client end in the system 200. The server 202 is, for example, a cloud server. By encrypting the NN model according to the key codebooks and transmitting the garbled truth tables through using OT protocol, the content of the NN model provided by the electrical device 204 (client end) will not be released to the server 202 (cloud server), and the privacy of the NN model is protected. Besides, by sending a circuit graph Gc instead of the garbled circuit, using the garbled circuit code, and transmitting the garbled truth tables through using OT protocol, the content of the AI compiler of the server 202 (cloud server) will not be released to the electrical device 204 (client end). Therefore, the privacy of the AI compiler is also protected. The neural network (NN) processing method according to the embodiment of the disclosure will be described further below.

In cryptography, oblivious transfer (OT) protocol is a protocol in which a sender transfers one of many pieces of information to a receiver, but the sender remains oblivious as to what piece has been transferred. The first form of oblivious transfer was introduced in 1981 by Michael O. Rabin (Michael O. Rabin. "How to exchange secrets with oblivious transfer." Technical Report TR-81, Aiken Computation Laboratory, Harvard University, 1981.). A more useful form of oblivious transfer called 1-2 oblivious transfer or "1 out of 2 oblivious transfer" was developed later by Shimon Even, Oded Goldreich, and Abraham Lempel in 1985 (S. Even, O. Goldreich, and A. Lempel, "A Randomized Protocol for Signing Contracts", Communications of the ACM, Volume 28, Issue 6, pg. 637-647, 1985.). It is generalized to "1 out of n oblivious transfer" where the receiver gets exactly one element without the sender getting to know which element was queried, and without the receiver knowing anything about other elements that were not retrieved.

Figure 3A:
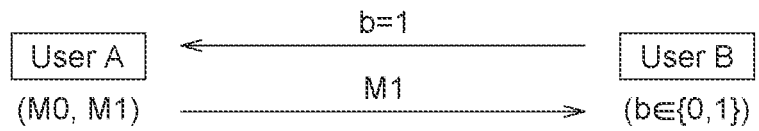
FIG. 3A shows a first OT scenario.
Figure 3B:
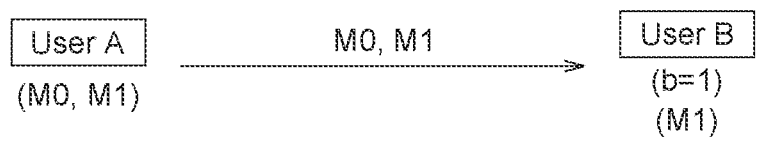
FIG. 3B shows a second OT scenario.
Figure 3C:
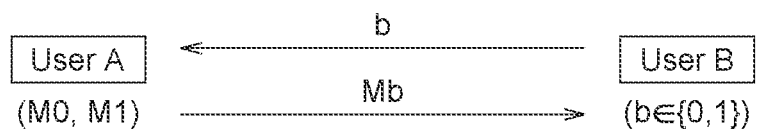
FIG. 3C shows the OT requirement.

Referring to FIG. 3A to FIG. 3C, FIG. 3A shows a first OT scenario, FIG. 3B shows a second OT scenario, and FIG. 3C shows the OT requirement. As shown in FIG. 3A, when user B sends bit value b=1 to user A for querying message M1, user A replies message M1 corresponding to b=1 to user B. However, in the first OT scenario as shown in FIG. 3A, user A knows the choice b (b=1) of user B. As shown in FIG. 3B, when user B chooses bit value b=1 and do not send bit value b=1 to user A, user A directly sends both messages M0 and M1 corresponding to b=0 and b=1 to user B. However, in the second OT scenario as shown in FIG. 3B, user B knows message M0 corresponding to b=0 which is not chosen by user B. As shown in FIG. 3C, user B sends bit value b (b may be 0 or 1), and user A sends only Message Mb (message Mb is M0 when the value of b is 0, and message Mb is M1 when the value of b is 1) to user B. Under this OT requirement, user A does not know the user B's choice (the value of b), and user B does not know user A's other message.

Figure 4A:
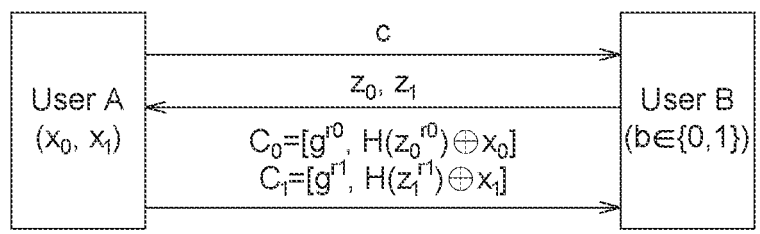
FIG. 4A illustrates the process of "1 out of 2 oblivious transfer protocol".

Referring to FIG. 4A, the process of "1 out of 2 oblivious transfer protocol" illustrated. It is assumed that given a generator g and $g^m$ mod q, it is hard to compute m under the Discrete-Log assumption, g is a large prime number, q is modulus, and m is an integer.

Assume $Z_q$ is a group of order q, that is, $Z_q$ represents the set of the elements of $g^m$ mod q, that is $Z_q = \{0, 1, 2, \ldots q-1\}$. Generator "g" is known to both user A and user B. User A randomly chooses an element of $Z_q$, which is presented by generator "c". User A transmits generator "c" to user B. User B randomly chooses an element of $Z_q$, which is presented by generator "k". User B chooses the bit value b, b belongs to the set $\{0,1\}$. User B also set $z_b = g^k$, $z_{1-b} = c/g^k$ (that is, when value "0" is chosen for b, $z_0 = g^k$, $z_1 = c/g^k$; when value "1" is chosen for b, $z_1 = g^k$, $z_0 = c/g^k$), then User B sends $z_b$ and $z_{1-b}$ to User A.

User A randomly chooses values "r0" and "r1", and generates values "$g^{r0}$" and "$g^{r1}$". User A has two pieces of information "$x_0$" and "$x_1$", and user A encrypts "$x_0$" and "$x_1$" with values "r0" and "r1", for example, user A generates the values $H(z_0^{r0}) \oplus x_0$ and $H(z_1^{r1}) \oplus x_1$. User A then sends data $C_0$ and $C_1$ to user B. Data $C_0$ and $C_1$ are defined in equation 1:

$$C_0 = [g^{r0}, H(z_0^{r0}) \oplus x_0]$$

$$C_1 = [g^{r1}, H(z_1^{r1}) \oplus x_1] \quad \text{(Equation 1)}$$

H is hash function that can be used to map data of arbitrary length to the length of x0 and x1. The operator "$\oplus$" represents bit-wise Exclusive OR operation.

After user B receives data $C_0$ and $C_1$, user B decrypts $C_b = [v_1, v_2]$ by computing $H(v_1^k) \oplus v_2$. Take b=0 for example. When b=0, $z_0=g^k$, $z_1=c/g^k$. Then, $z_0{}^{r0}=(g^k)^{r0}$, $z_1{}^{r1}=(c/g^k)^{r1}$, and $C_b=C_0=[v_1, v_2]=[g^{r0}, H(z_0{}^{r0}) \oplus x_0]$. Therefore, $H(v_1{}^k) \oplus v_2 = H(g^{r0})^k \oplus H(z_0{}^{r0}) \oplus x_0 = H(g^{r0})^k \oplus H((g^k)^{r0}) \oplus x_0 = x_0$. However, since $C_1=[g^{r1}, H(z_1{}^{r1}) \oplus x_1]$ and $H(v_1{}^k) \oplus v_2$ for $C_1$ equal to $H((g^{r1})^k) \oplus H(z_1{}^{r1}) \oplus x_1 = H((g^{r1})^k) \oplus H((c/g^k)^{r1}) \oplus x_1$. Since $c^{r1}$ is unknown, the value of "$x_1$" cannot be obtained. As a result, user B can obtain the information "$x_0$" without knowing the information "$x_1$", and user A does not know the value of b chosen by user B. That is, user B gets only one of $x_0$ and $x_1$, and user A does not know which one of $x_0$ and $x_1$ is got by user B.

Figure 4B:
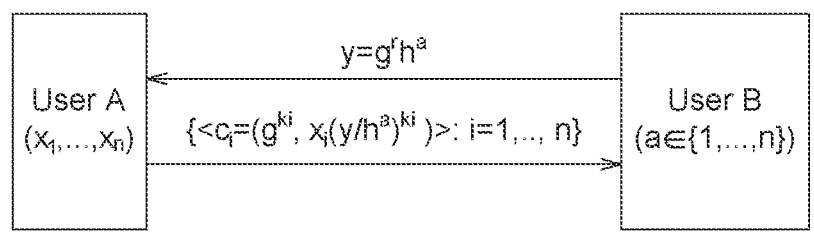
FIG. 4B illustrates the process of "1 out of n oblivious transfer protocol".

Referring to FIG. 4B, the process of "1 out of n oblivious transfer protocol" is illustrated. It is assumed that given a generator g and $g^m$ mod q, it is hard to compute m under the Discrete-Log assumption, g is a large prime number, q is modulus, and m is an integer.

Assume $Z_q$ is a group of order q, that is, $Z_q$ represents the set of the elements of $g^m$ mod q, that is $Z_q=\{0, 1, 2, \ldots q-1\}$. Generators "g" and "h" of $Z_q$ are known to both user A and user B. User B chooses a value a, a belongs to the set $\{1, \ldots, n\}$, n is an integer. User B randomly chooses an element of $Z_q$, which is presented by generator "r", and User B transmits a value $y=g^r h^a$ to user A. User A randomly chooses n elements of $Z_q$, which is presented by generator "$k_1, k_2, \ldots k_n$". User A has information $(x_1, x_2, \ldots, x_n)$. Then, user A transmits $\{<c_i=(g^{ki}, x_i(y/h^a)^{ki})>: i=1, \ldots, n\}$ to user B. That is, user A transmits $c_1=(g^{k1}, x_1(y/h^a)^{k1})$, $c_2=(g^{k2}, x_2(y/h^a)^{k2}), \ldots c_n=(g^{kn}, x_n(y/h^a)^{kn})$ to user B. User B receives $c_a=(v,w)=(g^{ka}, x_a(y/h^a)^{ka})$, and computes $x_a=w/v^r$. For example, when user B chooses a=2, $x_2=w/v^r=x_a(y/h^a)^{ka}/(g^{ka})^r=x_a(g^r h^a/h^a)^{ka}/(g^{ka})^r=x_a=x_2$. As a result, user B can obtain the information "$x_2$" without knowing the information "$x_1$", and "$x_3$ to $x_n$", and user A does not know the value of a chosen by user B. That is, user B gets only one of $x_0$ to $x_n$, and user A does not know which one of $x_0$ to $x_n$ is got by user B.

Figure 5A:
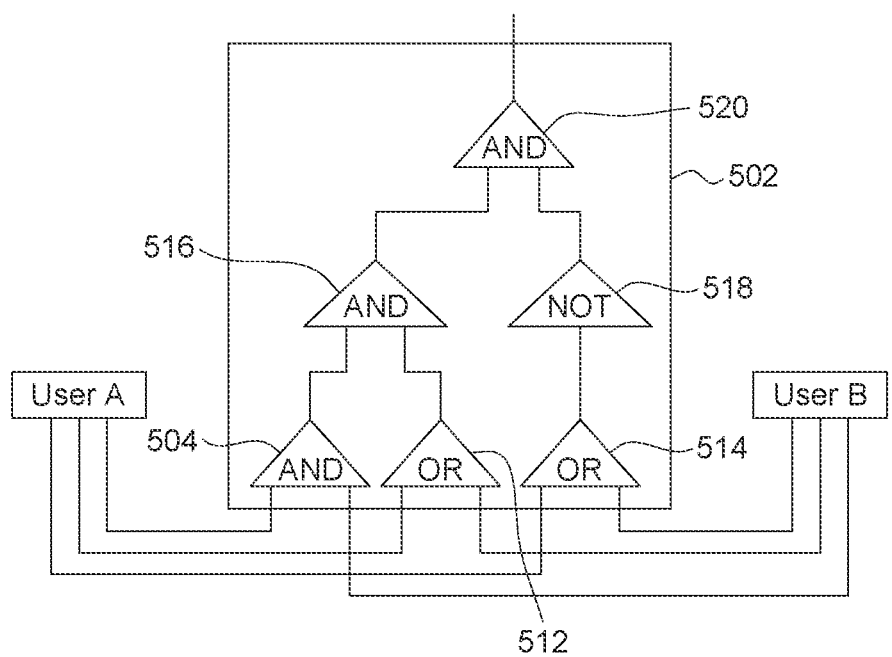
FIG. 5A shows an example of garbled circuit for the garbled circuit protocol.
Figures 5B, 5C:
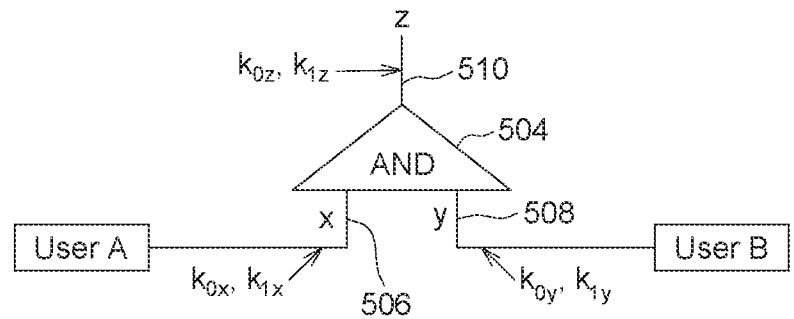
FIG. 5B shows an example of the input-wire keys and output-wire keys for an AND gate.
FIG. 5C shows the corresponding truth table of the AND gate of FIG. 5B and the corresponding encrypted truth table for the AND gate of FIG. 5B.

Referring to FIG. 5A to FIG. 5C, the process of garbled circuit protocol is illustrated. FIG. 5A shows an example of garbled circuit for the garbled circuit protocol, FIG. 5B shows an example of the input-wire keys and output-wire keys for an AND gate, and FIG. 5C shows the corresponding truth table of the AND gate of FIG. 5B and the corresponding encrypted truth table (garbled truth table) for the AND gate of FIG. 5B. Garbled circuit protocol is a cryptographic protocol that enables two-party secure computation in which two parties can jointly evaluate a function over their private inputs. In the garbled circuit protocol, the function has to be described as a Boolean circuit. The garbled circuit was firstly provided by Andrew Yao (Yao, Andrew Chi-Chih (1986), "How to generate and exchange secrets" 27th Annual Symposium on Foundations of Computer Science (SFCS 1986), Foundations of Computer Science, 1986.).

As shown in FIG. 5A, two parties user A and user B both know the Boolean circuit 502 which perform function f. User A has input x and User B has input y. User A and User B securely compute f(x, y) without user A knowing user B's input and without user B knowing user A's input. As shown in FIG. 5B, firstly, user A picks two random keys for each wire. One key corresponds to "0", the other key corresponds to "1". There are 6 keys in total for a gate with 2 input wires. Take AND gate 504 for example. The AND gate 504 has two input wires 506 and 508 and one output wire 510. The AND gate 504 receives value x on the input wire 506 and receives value y on the input wire 508. The AND gate 504 outputs value z on the output wire 510. User A picks two random keys $K_{0x}$ and $K_{1x}$ for the input wire 506. Input-wire key $K_{0x}$ corresponds to "0" and input-wire key $K_{1x}$ corresponds to "1". User A picks two random keys $K_{0y}$ and $K_{1y}$ for the input wire 508. Input-wire key $K_{0y}$ corresponds to "0" and input-wire key $K_{1y}$ corresponds to "1". User A also picks two random keys $K_{0z}$ and $K_{1z}$ for the output wire 510. The output-wire key $K_{0z}$ corresponds to "0" and output-wire key $K_{1z}$ corresponds to "1".

Then, user A encrypts each row of the truth table of AND gate 504 by encrypting the output-wire keys $K_{0z}$ and $K_{1z}$ with the corresponding pair of input-wire keys, as shown in FIG. 5C. For example, user A encrypts the output-wire key $K_{0z}$ with the corresponding pair of input-wire keys $K_{0x}$ and $K_{0y}$, corresponding to the first row of the truth table which shows the relation that z=0 when x=0 and y=0 to generate the content $E_{k0x}(E_{k0y}(k_{0z}))$ for the first row of the encrypted truth table. Function $E_{k0y}(k_{0z})$ represents encrypting the output-wire key $K_{0z}$ with using the input-wire key $K_{0y}$, and function $E_{k0x}(E_{k0y}(k_{0z}))$ represents encrypting the value of $E_{k0y}(k_{0z})$ with using the input-wire key $K_{0x}$. The output-wire key $K_{0z}$ can be decrypted by using the input-wire keys $K_{0y}$ and $K_{0x}$.

User A encrypts the output-wire keys $K_{0z}$ with the corresponding pair of input-wire keys $K_{0x}$ and $K_{1y}$, corresponding to the second row of the truth table which shows the relation that z=0 when x=0 and y=1 to generate the content $E_{k0x}(E_{k1y}(k_{0z}))$ for the second row of the encrypted truth table. Function $E_{k1y}(k_{0z})$ represents encrypting the output-wire key $K_{0z}$ with using the input-wire key $K_{1y}$, and function $E_{k0x}(E_{k1y}(k_{0z}))$ represents encrypting the value of $E_{k1y}(k_{0z})$ with using the input-wire key $K_{0x}$. The output-wire key $K_{0z}$ can be decrypted by using the input-wire keys $K_{1y}$ and $K_{0x}$.

User A encrypts the output-wire keys $K_{0z}$ with the corresponding pair of input-wire keys $K_{1x}$ and $K_{0y}$, corresponding to the third row of the truth table which shows the relation that z=0 when x=1 and y=0 to generate the content $E_{k1x}(E_{k0y}(k_{0z}))$ for the third row of the encrypted truth table. Function $E_{k0y}(k_{0z})$ represents encrypting the output-wire key $K_{0z}$ with using the input-wire key $K_{0y}$, and function $E_{k1x}(E_{k0y}(k_{0z}))$ represents encrypting the value of $E_{k0y}(k_{0z})$ with using the input-wire key $K_{1x}$. The output-wire key $K_{0z}$ can be decrypted by using the input-wire keys $K_{0y}$ and $K_{1x}$.

Similarly, user A encrypts the output-wire keys $K_{1z}$ with the corresponding pair of input-wire keys $K_{1x}$ and $K_{1y}$, corresponding to the fourth row of the truth table which shows the relation that z=1 when x=1 and y=1 to generate the content $E_{k1x}(E_{k1y}(k_{1z}))$ for the fourth row of the encrypted truth table. Function $E_{k1y}(k_{1z})$ represents encrypting the output-wire key $K_{1z}$ with using the input-wire key $K_{1y}$, and function $E_{k1x}(E_{k1y}(k_{1z}))$ represents encrypting the value of $E_{k1y}(k_{1z})$ with using the input-wire key $K_{1x}$. The output-wire key $K_{1z}$ can be decrypted by using the input-wire keys $K_{1y}$ and $K_{1x}$.

After the encrypted truth table for the AND gate 504 is generated, each row of the encrypted truth table may be listed in a random order to get more protection. The encrypted truth table is taken as a garbled truth table which user A sends to user B. User A may perform similar process described above to generate the encrypted truth table (garbled truth table) for other gates in the Boolean circuit in FIG. 5A. For example, User A may perform similar process described above to generate the encrypted truth table (garbled truth table) for OR gates 512, OR gate 514, AND gate 516, NOT gate 518, and AND gate 520 as shown in FIG. 5A. The output-wire key of one gate may be used as the input-wire key of another gate. For example, the output-wire keys $K_{0z}$ and $K_{1z}$ of the AND gate 504 may be used as the input-wire key of AND gate 516.

The main steps for the garbled circuit protocol will be descripted below with one example. In main step 1, when user A's bit value is 1, user A simply sends input-wire key $k_{1x}$ to user B. When user A's bit value is 0, user A simply sends input-wire key $k_{0x}$ to user B. In main step 2, when user B's bit value is b, user B simply retrieves $k_{by}$ from user A by using OT protocol. That is, user A sends input-wire keys $k_{0y}$ and $k_{1y}$ to user B, and user B only retrieves $k_{0y}$ from user A by using OT protocol when user B's bit value is 0 and user B only retrieves $k_{1y}$ from user A by using OT protocol when user B's bit value is 1.

In main step 3, assuming user B's bit value is 0, user B can use input-wire keys $k_{1x}$ and $k_{0y}$ to compute $k_{0z}$ based on the garbled truth table which user A has sent to user B. Since user B only has input-wire keys $k_{1x}$ and $k_{0y}$, user B cannot decrypt $k_{0z}$ by the content $E_{k0x}(E_{k0y}(k_{0z}))$ in the first row of garbled truth table in FIG. 5C, user B cannot decrypt $k_{0z}$ by the content $E_{k0x}(E_{k1y}(k_{0z}))$ in the second row of garbled truth table in FIG. 5C, user B cannot decrypt $k_{0z}$ by the content $E_{k1x}(E_{k1y}(k_{1z}))$ in the fourth row of garbled truth table in FIG. 5C. User B can only decrypt $k_{0z}$ by the content $E_{k1x}(E_{k0y}(k_{0z}))$ in the third row of garbled truth table in FIG. 5C. Therefore, user B blindly computes AND(1,0)=0 for the function of AND gate 504, that is, user B obtains output-wire key $k_{0z}$ as a key-type output value based on input-wire keys $k_{1x}$ and $k_{0y}$ as key-type input values even user B does not know that output-wire key $k_{0z}$ corresponds to bit value 0.

After user B finish the computation for AND gate 504, user B may further proceed with the computation for other gates, for example, OR gate 512, OR gate 514, AND gate 516, NOT gate 518, and AND gate 520 as shown in FIG. 5A by repeating above main steps 1 to 3. For example, after user B gets the key-type input values of OR gate 512, user B decrypts the key-type output value of OR gate 512 based on the key-type input values of OR gate 512 by using the garbled truth table of OR gate 512. User B then takes the key-type output of AND gate 504 and the key-type output of OR gate 512 as the inputs of the AND gate 516 to obtain the output of AND gate 516. That is, user B takes the key-type output value of AND gate 504 and the key-type output value of OR gate 512 as the key-type input values of the AND gate 516 to obtain the key-type output value of AND gate 516 based on the garbled truth table of AND gate 516. Then, user B takes the key-type output value of AND gate 516 and the key-type output value of NOT gate 518 as the key-type input values of the AND gate 520 to obtain the key-type output value of AND gate 520 based on the garbled truth table of AND gate 520. User A may decrypts the key-type output value of AND gate 520 to obtain the corresponding bit value of the output of AND gate 520 based on the relationship between the bit value of the output of AND gate 520 and the corresponding output-wire keys of AND gate 520.

Referring to FIG. 1 and FIG. 2 again, the process of transforming an AI compiler code of an AI compiler to a garbled circuit code by performing steps 102 to 110 will be described in more detail. The AI compiler is, for example, implemented by a software program. The software program is firstly converted to a circuit code, for example, a Boolean circuit code. Please refer to "Niklaus Wirth, 'Hardware compilation: translating programs into circuits', Computer 31.6 (1998): P. 25-31", which recites that instead of separate programming languages and hardware description languages, a single language could conceivably permit us to compile parts of a program into instruction sequences for a conventional processor and other parts into circuits for programmable gate arrays.

Figure 6:
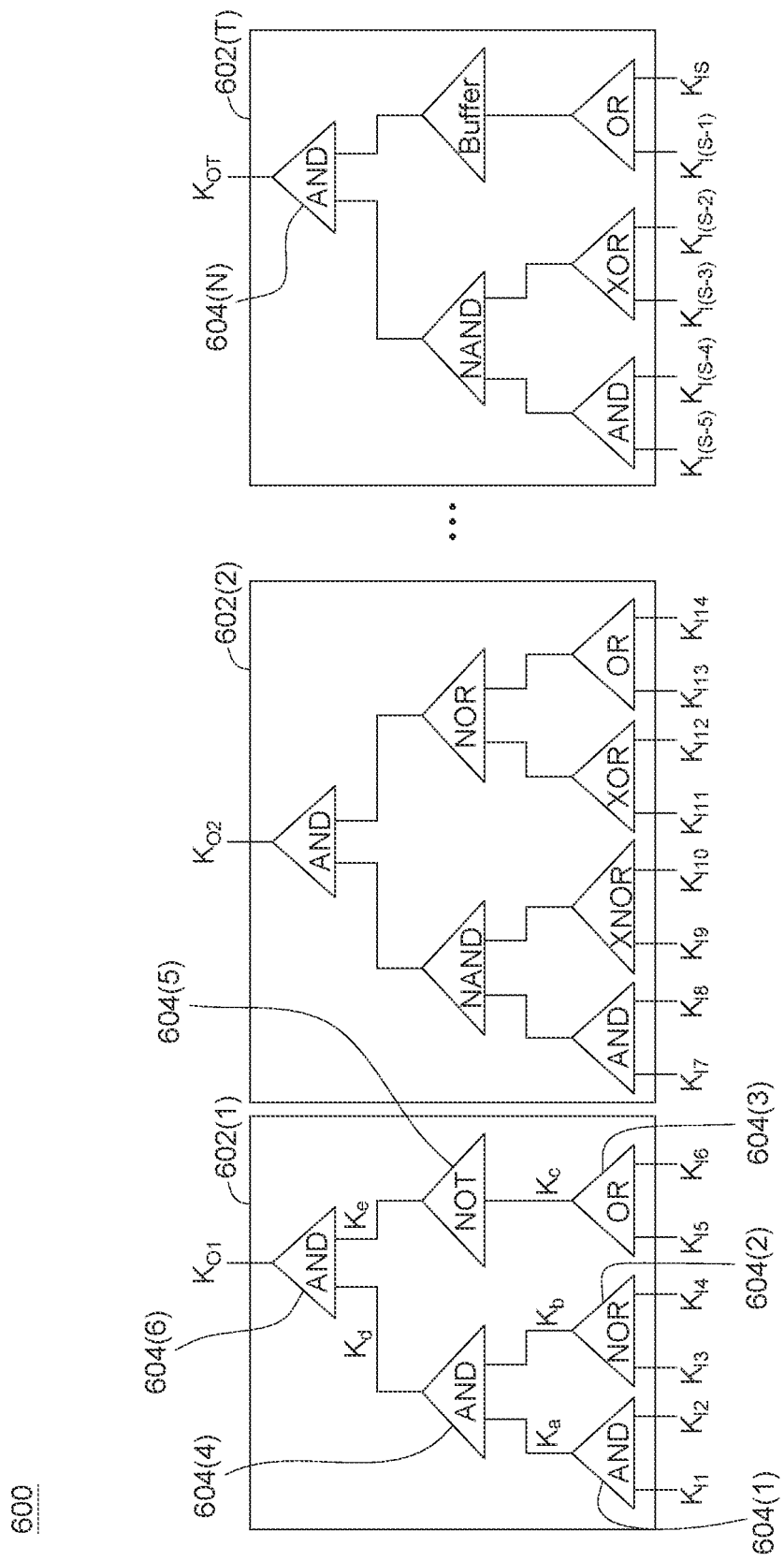
FIG. 6 shows an example of the gargled circuit.

Then, the circuit code is converted to a garbled circuit code by garbled circuit protocol described above. The garbled circuit code can be simulated by the function of a garbled circuit. FIG. 6 shows an example of the gargled circuit. Gargled circuit 600 includes a number of circuit units, for example, T circuit units, T is an integer. T circuit units includes circuit unit 602(1), circuit unit 602(2), . . . circuit unit 602(T). Each circuit unit may have a number of logic gates. For example, the circuit unit 602(1) has logic gates 604(1) to 604(6). For example, the logic gate 604(1) is AND logic gate, the logic gate 604(2) is NOR logic gate, the logic gate 604(3) is OR logic gate, the logic gate 604(4) is AND logic gate, the logic gate 604(5) is NOT logic gate, and the logic gate 604(6) is AND logic gate.

Figure 7:
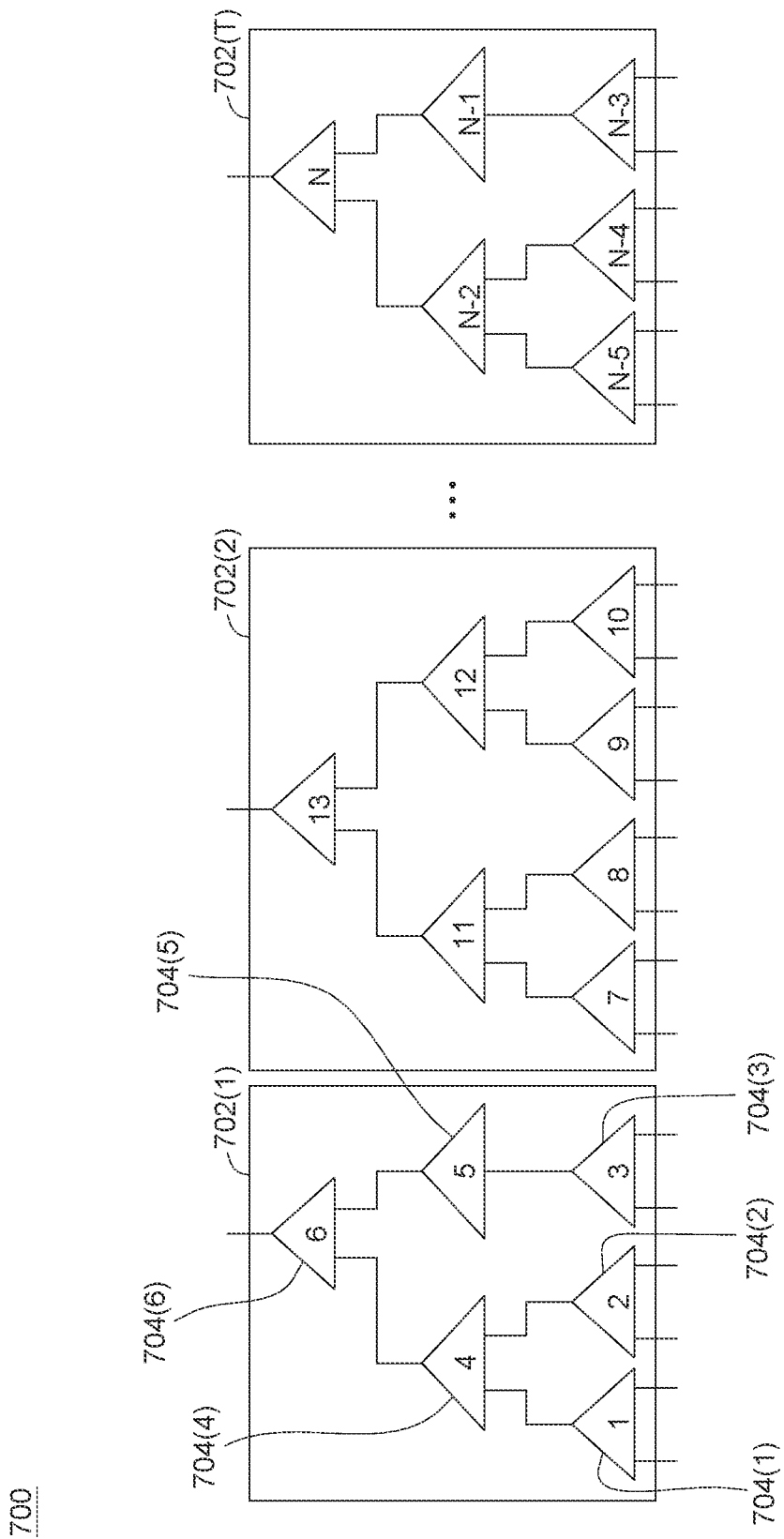
FIG. 7 shows an example of the circuit graph corresponding to the garbled circuit of FIG. 6.

In step 102 of FIG. 1, the server 202 sends a circuit graph Gc of a garbled circuit corresponding to the garbled circuit code to the electrical device 204. FIG. 7 shows an example of the circuit graph 700 corresponding to the garbled circuit 600 of FIG. 6. The circuit graph 700 is a circuit diagram which has a number of graph gates without indicating the type of the graph gates. The connection relationship of these graph gates are shown in the circuit diagram. For example, the circuit graph 700 has a number of graph units. The graph units include graph units 702(1) to 702(T). The graph unit 702(1) includes graph gates 704(1) to 704(6). The output of the graph gate 704(1) and the output of the graph gate 704(2) are connected to the inputs of the graph gate 704(4), similar to the connection relationship of logic gates 604(1), 604(2), and 604(4) in which the output of the logic gate 604(1) and the output of the logic gate 604(2) are connected to the inputs of the logic gate 604(4). However, the type of logic gates in garbled circuit 600 is not indicated in the circuit graph 700. For example, the types of graph gates 704(1) to 704(6) are not indicated in the circuit graph 700. Take the graph gate 704(1) for example. Although the logic gate 604(1) is AND logic gate, it is unknown that whether the graph gate 704(1) is also a AND gate or not.

In step 104, a number of key codebooks for a number of candidate gates corresponding to each logic gate are created by the electrical device 204. The candidate gates includes at least one 1-input candidate gate and at least one 2-input candidate gate. The garbled truth tables includes 1-input garbled truth tables and 2-input garbled truth tables. For example, the at least one 1-input candidate gate includes a buffer gate and an NOT gate, for example, a buffer candidate gate and an NOT candidate gate. The at least one 2-input candidate gate includes an AND gate, an OR gate, an NAND gate, an NOR gate, an XOR gate, and an XNOR gate, for example, an AND candidate gate, an OR candidate gate, an NAND candidate gate, an NOR candidate gate, an XOR candidate gate, and an XNOR candidate gate.

Figure 8A:
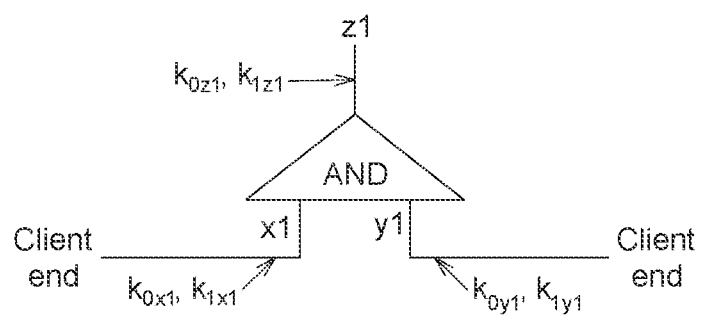
FIG. 8A to FIG. 8H show examples of input-wire keys, output-wire keys, truth tables, and corresponding encrypted truth tables for AND candidate gate, OR candidate gate, NAND candidate gate, NOR candidate gate, XOR candidate gate, XNOR candidate gate, buffer candidate gate, and NOT candidate gate.
Figure 8A:
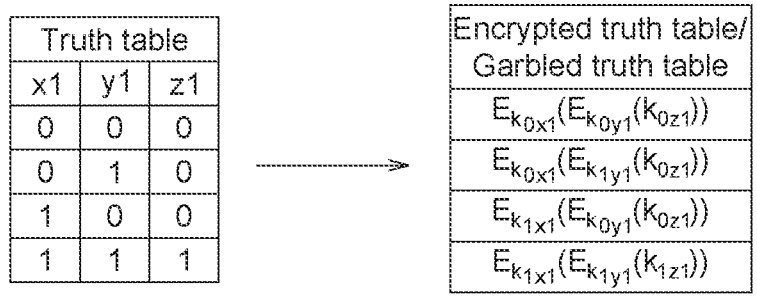
Figure 8B:
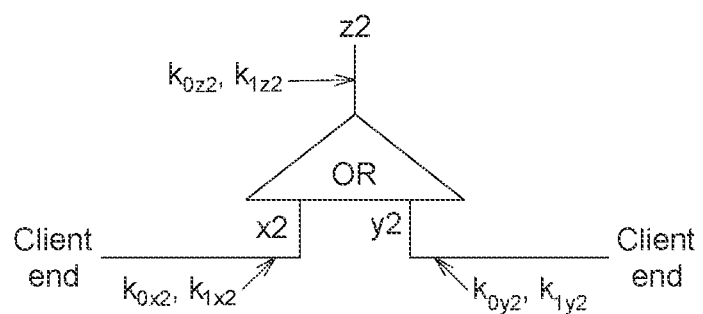
Figure 8B:
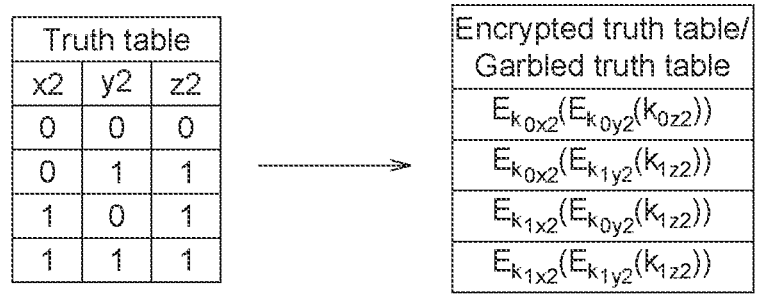
Figure 8C:
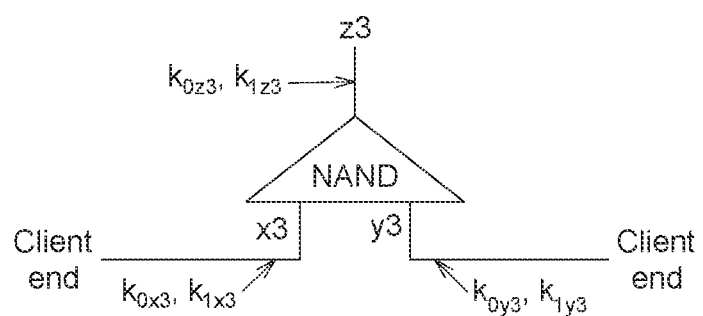
Figure 8C:
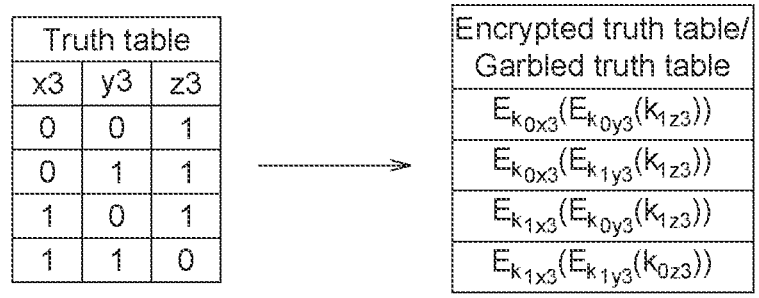
Figure 8D:
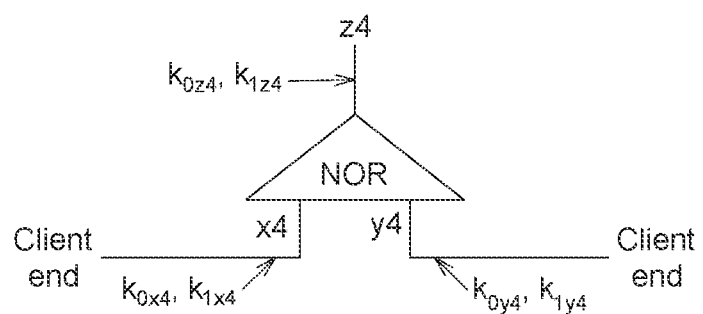
Figure 8D:
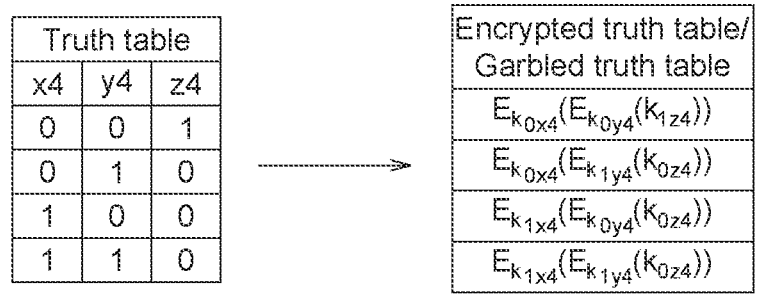
Figure 8E:
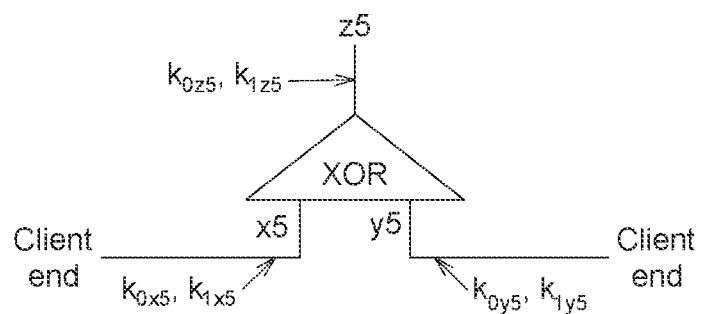
Figure 8E:
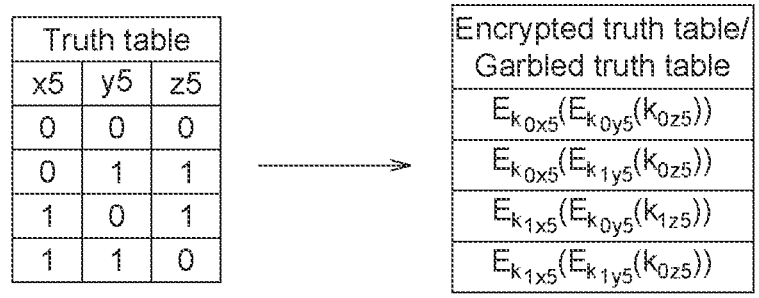
Figure 8F:
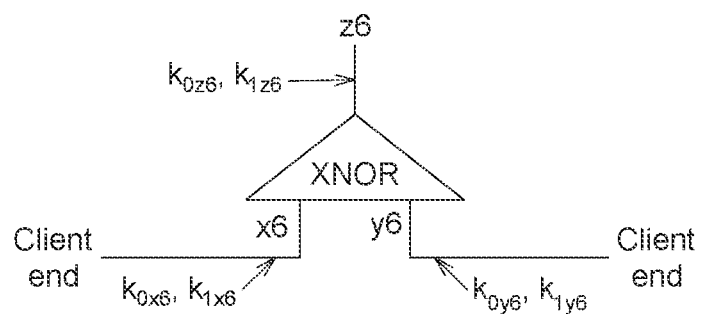
Figure 8F:
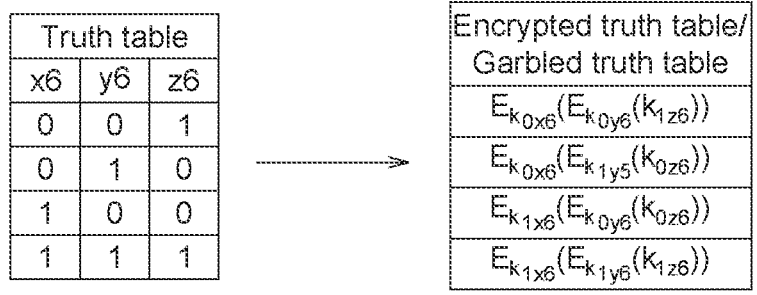
Figure 8G:
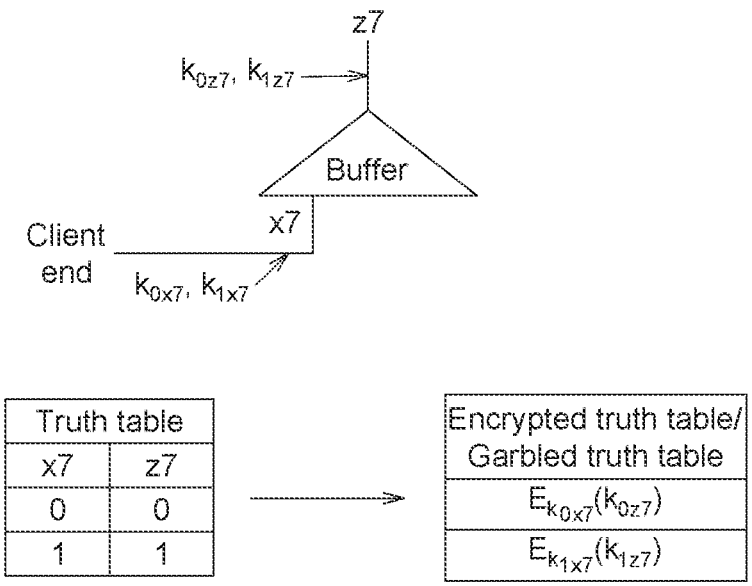
Figure 8H:
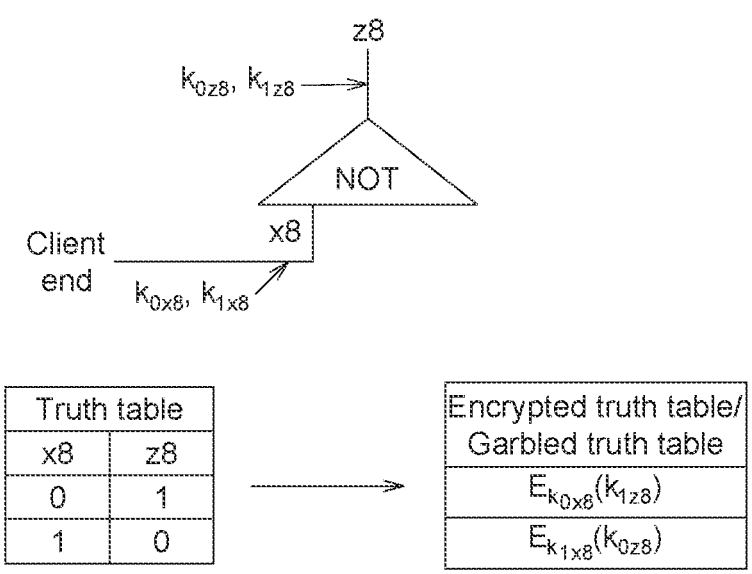

Referring to FIG. 8A to FIG. 8H, examples of input-wire keys, output-wire keys, truth tables, and corresponding encrypted truth tables for AND candidate gate, OR candidate gate, NAND candidate gate, NOR candidate gate, XOR candidate gate, XNOR candidate gate, buffer candidate gate, and NOT candidate gate are shown. Assume that the logic gates includes a first logic gate 604(1) to an N-th logic gate 604(N), the candidate gates have a first type candidate gate to an M-th type candidate gate, M and N are integers. Each of the candidate gates has at least one input wire and an output wire. For a particular candidate gate among the candidate gates, at least one input-wire key corresponding to the at least one input wire of the particular candidate gate is provided, and at least one output-wire key corresponding to the output wire of the particular candidate gate is provided. Each row of a truth table of the particular candidate gate is encrypted by encrypting the output-wire key with the at least one input-wire key. Take the AND candidate gate in FIG. 8A for example. Two input-wire keys $K_{0x1}$ and $K_{1x1}$ corresponding to input wire x1 of the AND candidate gate are provided, two input-wire keys $K_{0y1}$ and $K_{1y1}$ corresponding to input wire y1 of the AND candidate gate are provided, and output-wire keys $K_{0z1}$ and $K_{1z1}$ corresponding to the output wire z1 of the AND candidate gate are provided as show in FIG. 8A. Each row of the truth table of the AND candidate gate is encrypted by encrypting the output-wire key with the at least one input-wire key to generate the encrypted truth table (i.e. garbled truth table), as shown in FIG. 8A.

Take the logic gate 604(1) and graph gate 704(1) for example. Since graph gate 704(1) is a 2-input graph gate as shown in the circuit graph 700 of FIG. 7, the graph gate 704(1) may be of the same type as one of the at least one 2-input candidate gates. That is, the logic gate 604(1) and the graph gate 704(1) correspond to AND candidate gate, OR candidate gate, NAND candidate gate, NOR candidate gate, XOR candidate gate, and XNOR candidate gate. The key codebook for each candidate gate includes the bit values of input or output and the corresponding input-wire keys or output-wire keys. For example, the key codebook for the AND candidate gate records that bit value "0" of input x1 corresponds to the input-wire key $K_{0x1}$, bit value "1" of input x1 corresponds to the input-wire key $K_{1x1}$, bit value "0" of input y1 corresponds to the input-wire key $K_{0y1}$, bit value "1" of input y1 corresponds to the input-wire key $K_{1y1}$, bit value "0" of output z1 corresponds to the output-wire key $K_{0z1}$, bit value "1" of output z1 corresponds to the output-wire key $K_{1z1}$.

In step 106, a number of garbled truth tables for the candidate gates corresponding to each logic gate are generated by the electrical device 204. Take the logic gate 604(1) and graph gate 704(1) for example. Since the electrical device 204 (client end) does not know the type of gate for graph gate 704(1) and the electrical device 204 knows that the graph gate 704(1) is a two input graph gate, the electrical device 204 knows the candidate gates for the graph gate 704(1) includes AND candidate gate, OR candidate gate, NAND candidate gate, NOR candidate gate, XOR candidate gate, and XNOR candidate gate. Therefore, the electrical device 204 generates the garbled truth tables for AND candidate gate, OR candidate gate, NAND candidate gate, NOR candidate gate, XOR candidate gate, and XNOR candidate gate corresponding to the logic gate 604(1). Furthermore, take the logic gate 604(5) and graph gate 704(5) for example. Since the electrical device 204 does not know the type of gate for graph gate 704(5) and the electrical device 204 knows the graph gate 704(5) is an one input graph gate, the electrical device 204 knows the candidate gates for the graph gate 704(5) includes a buffer candidate gate and an NOT candidate gate. Therefore, the electrical device 204 generates the garbled truth tables for the buffer candidate gate and the NOT candidate gate corresponding to the logic gate 604(5).

In step 108, the garbled truth tables for the candidate gates corresponding to each logic gate are transmitted to the server 202 by the electrical device 204 through using OT protocol. The circuit graph 700 of the garbled circuit 600 is, for example, a numbered circuit graph. The numbered circuit graph 700 has the graph gates assigned with numbers 1 to N without indicating the type of the graph gates. For example, the graph gates 704(1) to 704(6) of the graph unit 702(1) are sequentially numbered as 1 to 6. Similarly, the graph gates of graph units 702(2) to 702(T) are also numbered from 7 to N.

The process of the step 108 may include sending a request R(i) corresponding to an i-th logic gate of the logic gates to the electrical device 204 by the server 202, wherein i is an integer between 1 and N; and transmitting the garbled truth table $X_1(i)$ of the first type candidate gate, the garbled truth table $X_2(i)$ of a second type candidate gate, . . . the garbled truth table $X_M(i)$ of the M-th type candidate gate corresponding to the i-th logic gate to the server 202 in response to the request R(i) by the electrical device 204. When the i-th logic gate is a two input-wire logic gate, set R(i)=$a_i$ ($a_i$ belongs to the set $\{1, 2, \ldots, 6\}$) to correspond to the i-th logic gate, the i-th logic gate belongs to the set {AND logic gate, OR logic gate, NAND logic gate, NOR logic gate, XOR logic gate, XNOR logic gate}. When the i-th logic gate is a one input-wire logic gate, set R(i)=$b_i$ ($b_i$ belongs to the set $\{0,1\}$) to correspond to the i-th logic gate, the i-th logic gate belongs to the set {buffer logic gate, NOT logic gate}.

For example, when i=1, the server 202 sends a request R(1) corresponding to the logic gate 604(1) to the electrical device 204. And, the electrical device 204 transmits the garbled truth table $X_1(1)$ of AND candidate gate, the garbled truth table $X_2(1)$ of OR candidate gate, the garbled truth table $X_3(1)$ of NAND candidate gate, the garbled truth table $X_4(1)$ of NOR candidate gate, the garbled truth table $X_5(1)$ of XOR candidate gate, and the garbled truth table $X_6(1)$ of XNOR candidate gate corresponding to the logic gate 604(1) to the server 202 in response to the request R(1). Since the logic gate 604(1) is a two input wire logic gate, the value of M equals to 6.

Furthermore, when i=5, the server 202 sends a request R(5) corresponding to the logic gate 604(5) to the electrical device 204. And, the electrical device 204 transmits the garbled truth table $X_1(5)$ of buffer candidate gate and the garbled truth table $X_2(5)$ of NOT candidate gate corresponding to the logic gate 604(5) to the server 202 in response to the request R(5). Since the logic gate 604(5) is one input wire logic gate, the value of M equals to 2.

In step 110, a target garbled truth table of each logic gate through using OT protocol based on the garbled truth tables for the candidate gates corresponding to each logic gate is obtained by the server 202. The process of step 110 may include obtaining the target garbled truth table of the i-th logic gate which is corresponding to the garbled truth table of a j-th type candidate gate by the server through a decrypting process by using OT protocol, the j-th type candidate gate has the same type of gate with the i-th logic gate, j is an integer between 1 and M.

Take i=1 for example. The server 202 obtains the target garbled truth table TG(1) of the logic gate 604(1) through using OT protocol based on the garbled truth tables for the candidate gates $X_1(1)$ to $X_6(1)$ corresponding to the logic gate 604(1) by obtaining the target garbled truth table TG(1) of the logic gate 604(1) which is corresponding to the garbled truth table of a first type candidate gate (i.e. the garbled truth table of AND candidate gate $X_1(1)$) by the server 202 through a decrypting process by using OT protocol. The first type candidate gate (i.e. AND candidate gate $X_1(1)$) has the same type of gate with the logic gate 604(1).

Take i=5 for example. The server 202 obtains the target garbled truth table TG(5) of the logic gate 604(5) through using OT protocol based on the garbled truth tables for the candidate gates $X_1(5)$ to $X_2(5)$ corresponding to the logic gate 604(5) by obtaining the target garbled truth table TG(5) of the logic gate 604(5) which is corresponding to the garbled truth table of a second type candidate gate (i.e. the garbled truth table of NOT candidate gate $X_2(5)$) by the server 202 through a decrypting process by using OT protocol. The second type candidate gate (i.e. NOT candidate gate $X_2(5)$) has the same type of gate with the logic gate 604(5).

The above steps 102 to 110 may be regarded as performing a set procedure for setting the AI compiler in server 202. Steps 112 to 114 may be regarded as performing an execution procedure for encrypting and decrypting an NN model sent by the client end (i.e. the electrical device 204).

In step 112, an NN model is encrypted according to the key codebooks by the electrical device 204. The process of step 112 may include transforming the NN model to binary values and transforming the binary values to key-type original model values according to the key codebooks by the electrical device 204. The key-type original model values are sent to the server 202. For example, the electrical device 204 encrypts an NN model which is pre-trained by a model developer with trained parameters or weights according to the key codebooks by transforming the NN model to binary values (for example, binary values ($b_{I0}$ $b_{I1}$ $b_{I2}$ ... $b_{IS}$), S is an integer) firstly and transforming the binary values to key-type original model values (for example, key-type original model values ($K_{I1}$ $K_{I2}$ $K_{I3}$ ... $K_{IS}$), S is an integer) according to the key codebooks. The key-type original model values ($K_{I1}$ $K_{I2}$ $K_{I3}$ ... $K_{IS}$) are, for example, chosen from input-wire keys corresponding to the input ends of circuit graph 700. The input ends of circuit graph 700 may include the input ends of the first level graph gates of each circuit unit, for example, the input end of the graph gates numbered as 1, 2, 3, 7, 8, 9, 10, . . . , N-5, N-4, N-3, as shown in FIG. 7. The electrical device (client end) 204 sends the key-type original model values ($K_{I1}$ $K_{I2}$ $K_{I3}$ ... $K_{IS}$) to the server 202 to be the input of the garble circuit 600, as shown in FIG. 6.

In step 114, a compiled NN model of the encrypted NN model is generated according to the garbled circuit code with the target garbled truth table of each logic gate by the server 202. The process of step 114 may include performing the garbled circuit code based on the key-type original model values to generate key-type compiled model values of the compiled NN model. That is, since the AI complier in server 202 has been transformed to garbled circuit code corresponding to the garbled circuit 600 and the target garbled truth table of each logic gate has been obtained, the server 202 can generate the compiled NN model by evaluating the garbled circuit code with the inputted key-type original model values ($K_{I1}$ $K_{I2}$ $K_{I3}$ ... $K_{IS}$).

The process of evaluating the garbled circuit code can be explained with the garbled circuit 600. Take the circuit unit 602(1) for example. The key-type input values $K_{I1}$ and $K_{I2}$ are inputted to the AND logic gate 604(1). The AND logic gate 604(1) uses the target garbled truth table TG(1) (i.e. the garbled truth table of the AND candidate gate for the graph gate 704(1)) of logic gate 604(1) to get a key-type output value $K_a$ of the AND logic gate 604(1) with the key-type input value $K_{I1}$ and $K_{I2}$. Similarly, the NOR logic gate 604(2) uses the target garbled truth table TG(2) (i.e. the garbled truth table of the NOR candidate gate for the graph gate 704(2)) of logic gate 604(2) to get a key-type output value $K_b$ of the NOR logic gate 604(2) with the key-type input values $K_{I3}$ and $K_{I4}$. The OR logic gate 604(3) uses the target garbled truth table TG(3) (i.e. the garbled truth table of the OR candidate gate for the graph gate 704(3)) of logic gate 604(3) to get a key-type output value $K_c$ of the OR logic gate 604(3) with the key-type input values $K_{I5}$ and $K_{I6}$. The AND logic gate 604(4) uses the target garbled truth table TG(4) (i.e. the garbled truth table of the AND candidate gate for the graph gate 704(4)) of logic gate 604(4) to get a key-type output value $K_d$ of the AND logic gate 604(4) with the key-type input values $K_a$ and $K_b$. The NOT logic gate 604(5) uses the target garbled truth table TG(5) (i.e. the garbled truth table of the NOT candidate gate for the graph gate 704(5)) of logic gate 604(5) to get a key-type output value $K_e$ of the NOT logic gate 604(5) with the key-type input value $K_c$. The AND logic gate 604(6) uses the target garbled truth table TG(6) (i.e. the garbled truth table of the AND candidate gate for the graph gate 704(6)) of AND logic gate 604(6) to get a key-type output value $K_{O1}$ of the AND logic gate 604(6) with the key-type input values $K_d$ and $K_e$.

The circuit units 602(2) to 602(T) perform similar process to generate the key-type output values $K_{O2}$ to $K_{OT}$, respectively. The key-type compiled model values of the compiled NN model is then generated as ($K_{O1}$ $K_{O2}$ $K_{O3}$ ... $K_{OT}$). The server 202 then sends the key-type compiled model values ($K_{O1}$ $K_{O2}$ $K_{O3}$ ... $K_{OT}$) of the compiled NN model to another electrical device 214.

The electrical device 214 further performs decrypting the compiled NN model according to the key codebooks to generate a machine code and performing the machine code. That is, the electrical device 204 sends the key codebooks Key_cb to the electrical device 214, and then the electrical device 214 decrypts the compiled NN model in the form of the key-type compiled model values ($K_{O1}$ $K_{O2}$ ... $K_{OT}$) according to the key codebooks Key_cb to generate a machine code and performing the machine code.

For example, the electrical device 214 may include a transmission circuit 216, a processor 218, and an AI execution module 220. The transmission circuit 216 receives the key-type compiled model values ($K_{O1}$ $K_{O2}$ ... $K_{OT}$). The processor 218 decrypts the key-type compiled model values ($K_{O1}$ $K_{O2}$ ... $K_{OT}$) by using the key codebooks Key_cb to generate binary values ($b_{O1}$ $b_{O2}$ ... $b_{OT}$). The processor 218 further transforms the binary values ($b_{O1}$ $b_{O2}$ ... $b_{OT}$) to a machine code (or a deployable code) which can be performed by the AI execution module 220. The AI execution module 220 may perform the machine code through a runtime module.

Referring to FIG. 2, the server 202 may include a transmission circuit 206 and a processor 208. The processor 208 is configured to transform an AI compiler code of an AI compiler to a garbled circuit code by performing following procedures. The processor 208 sends a circuit graph of a garbled circuit corresponding to the garbled circuit code to an electrical device 204 through the transmission circuit 206. The garbled circuit has a number of logic gates. The processor 208 receives a number of garbled truth tables for a number of candidate gates corresponding to each logic gate from the electrical device 204 through using OT protocol via the transmission circuit 206. The processor 208 obtains a target garbled truth table of each logic gate through using OT protocol based on the garbled truth tables for the candidate gates corresponding to each logic gate.

The electrical device 204 creates a number of key codebooks for the candidate gates corresponding to each logic gate, and an NN model is encrypted according to the key codebooks by the electrical device 204. The processor 208 is further configured to generate a compiled NN model of an encrypted NN model according to the garbled circuit code with the target garbled truth table of each logic gate.

Referring to FIG. 2, the electrical device 204 may include a transmission circuit 210 and a processor 212. The processor 212 is configured to assist the server 202 to transform an AI compiler code of an AI compiler to a garbled circuit code by performing following procedures. The processor 212 receives a circuit graph of a garbled circuit corresponding to the garbled circuit code from the server 202 through the transmission circuit 210. The garbled circuit has a number of logic gates. The processor 212 creates a number of key codebooks for a number of candidate gates corresponding to each logic gate. The processor 212 generates a number of garbled truth tables for the candidate gates corresponding to each logic gate. The processor 212 transmits the garbled truth tables for the candidate gates corresponding to each logic gate to the server 202 through using OT protocol via the transmission circuit 210.

The processor 212 is further configured to encrypt an NN model according to the key codebooks. The server 202 obtains a target garbled truth table of each logic gate through using OT protocol based on the garbled truth tables for the candidate gates corresponding to each logic gate. The server 202 generates a compiled NN model of an encrypted NN model according to the garbled circuit code with the target garbled truth table of each logic gate.

Although the embodiment in FIG. 2 illustrates the electrical device 204 and the electrical device 214, the electrical device 214 can be combined to the electrical device 204 in some embodiment. Therefore, the processor 208 of the server 202 can transmit the compiled NN model to the electrical device 204, and the compiled NN model is decrypted according to the key codebooks by the electrical device 204 to generate a machine code, and the machine code is performed by the electrical device 204.

By encrypting the NN model according to the key codebooks and transmitting the garbled truth tables through using OT protocol, the content of the NN model provided by the model provider (client end) will not be released to the cloud server, and the privacy of the NN model is protected. Besides, by sending a circuit graph instead of the garbled circuit, using the garbled circuit code, and transmitting the garbled truth tables through using OT protocol, the content of the AI compiler of the cloud server will not be released to the client end. Therefore, the privacy of the AI compiler is also protected.

This disclosure provides a secure AI complier (neural network compiler, deep learning compiler), which can complete NN compilation without knowing the pre-trained model, model parameters, and weights to generate a compiled and optimized and encrypted file, and then the client end can decrypt the encrypted file to generate the low-level machine code which can be executed on the hardware. The disclosure can achieve the function of protecting the NN model from being decoded by the compiler. The embodiment of the disclosure can increase the model privacy protection for the cloud AI compiler service. By using oblivious transfer protocol and garbled circuit (garbled gates) technology, the privacy protection mechanism for NN model compilation is achieved. Through the embodiment of this disclosure, model developers can protect their NN models, and the user can execute the compiled model code through obtains the decrypted information (for example, key codebook) from the model developers.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A neural network (NN) processing method, comprising: transforming an AI (artificial intelligence) compiler code of an AI compiler to a garbled circuit code by performing following steps:
   sending a circuit graph of a garbled circuit corresponding to the garbled circuit code to a first electrical device by a server, the garbled circuit having a plurality of logic gates;
   creating a plurality of key codebooks for a plurality of candidate gates corresponding to each logic gate by the first electrical device;
   generating a plurality of garbled truth tables for the candidate gates corresponding to each logic gate by the first electrical device;
   transmitting the garbled truth tables for the candidate gates corresponding to each logic gate to the server by the first electrical device through using OT (Oblivious Transfer) protocol; and
   obtaining a target garbled truth table of each logic gate through using OT protocol based on the garbled truth tables for the candidate gates corresponding to each logic gate by the server;
   encrypting an NN model according to the key codebooks by the first electrical device; and
   generating a compiled NN model of an encrypted NN model according to the garbled circuit code with the target garbled truth table of each logic gate by the server.

2. The method according to claim 1, wherein the candidate gates comprise at least one 1-input candidate gate and at least one 2-input candidate gate, the garbled truth tables comprises 1-input garbled truth tables and 2-input garbled truth tables, the at least one 1-input candidate gate comprises a buffer gate and an NOT gate, and the at least one 2-input candidate gate comprises an AND gate, an OR gate, an NAND gate, an NOR gate, an XOR gate, and an XNOR gate.

3. The method according to claim 1, wherein the circuit graph of the garbled circuit is a numbered circuit graph, the numbered circuit graph has a plurality of graph gates assigned with numbers without indicating the type of the graph gates, the logic gates comprises a first logic gate to an N-th logic gate, the candidate gates have a first type candidate gate to an M-th type candidate gate, M and N are integers, the step of transmitting the garbled truth tables for the candidate gates corresponding to each logic gate to the server by the first electrical device through using OT protocol comprises:
   sending a request R(i) corresponding to an i-th logic gate of the logic gates to the first electrical device by the server, wherein i is an integer between 1 and N; and
   transmitting the garbled truth table of the first type candidate gate, the garbled truth table of a second type candidate gate, . . . the garbled truth table of the M-th type candidate gate corresponding to the i-th logic gate to the server in response to the request R(i) by the first electrical device;
   wherein the step of obtaining the target garbled truth table of each logic gate through using OT protocol based on the garbled truth tables for the candidate gates corresponding to each logic gate by the server comprises obtaining the target garbled truth table of the i-th logic gate which is corresponding to the garbled truth table of a j-th type candidate gate by the server through a decrypting process by using OT protocol, the j-th type candidate gate has the same type of gate with the i-th logic gate, j is an integer between 1 and M.

4. The method according to claim 1, wherein each of the candidate gates has at least one input wire and an output wire, the step of generating the garbled truth tables for the candidate gates corresponding to each logic gate by the first electrical device comprises:
  for a particular candidate gate among the candidate gates, providing at least one input-wire key corresponding to the at least one input wire of the particular candidate gate, and providing at least one output-wire key corresponding to the output wire of the particular candidate gate; and
  encrypting each row of a truth table of the particular candidate gate by encrypting the output-wire key with the at east one input-wire key.

5. The method according to claim 1, wherein the step of encrypting the NN model according to the key codebooks by the first electrical device comprises:
  transforming the NN model to binary values; and
  transforming the binary values to key-type original model values according to the key codebooks;
  wherein the key-type original model values are sent to the server.

6. The method according to claim 5, wherein the step of generating the compiled NN model of the encrypted NN model according to the garbled circuit code with the target garbled truth table of each logic gate by the server comprises:
  performing the garbled circuit code based on the key-type original model values to generate key-type compiled model values of the compiled NN model.

7. The method according to claim 1, further comprising:
  decrypting the compiled NN model according to the key codebooks by the first electrical device or a second electrical device to generate a machine code; and
  performing the machine code by the first electrical device or the second electrical device.

8. A server for processing a neural network, comprising:
  a transmission circuit;
  a processor, configured to transform an AI compiler code of an AI compiler to a garbled circuit code by performing following procedures:
    sending a circuit graph of a garbled circuit corresponding to the garbled circuit code to a first electrical device through the transmission circuit, the garbled circuit having a plurality of logic gates;
    receiving a plurality of garbled truth tables for a plurality of candidate gates corresponding to each logic gate from the first electrical device through using OT protocol via the transmission circuit; and
    obtaining a target garbled truth table of each logic gate through using OT protocol based on the garbled truth tables for the candidate gates corresponding to each logic gate;
  wherein a plurality of key codebooks for the candidate gates corresponding to each logic gate are created by the first electrical device, an NN model is encrypted according to the key codebooks by the first electrical device, and the processor is further configured to generate a compiled NN model of an encrypted NN model according to the garbled circuit code with the target garbled truth table of each logic gate.

9. The server according to claim 8, wherein the candidate gates comprise at least one 1-input candidate gate and at least one 2-input candidate gate, the garbled truth tables comprises 1-input garbled truth tables and 2-input garbled truth tables, the at least one 1-input candidate gate comprises a buffer gate and an NOT gate, and the at least one 2-input candidate gate comprises an AND gate, an OR gate, an NAND gate, an NOR gate, an XOR gate, and an XNOR gate.

10. The server according to claim 8, wherein the circuit graph of the garbled circuit is a numbered circuit graph, the numbered circuit graph has a plurality of graph gates assigned with numbers without indicating the type of the graph gates, the logic gates comprises a first logic gate to an N-th logic gate, the candidate gates have a first type candidate gate to an M-th type candidate gate, M and N are integers, the procedure of receiving the garbled truth tables for the candidate gates corresponding to each logic gate from the first electrical device through using OT protocol via the transmission circuit comprises:
  sending a request R(i) corresponding to an i-th logic gate of the logic gates to the first electrical device, wherein i is an integer between 1 and N; and
  receiving the garbled truth table of the first type candidate gate, the garbled truth table of a second type candidate gate, . . . the garbled truth table of the M-th type candidate gate corresponding to the i-th logic gate related to the request R(i);
  wherein the procedure of obtaining the target garbled truth table of each logic gate through using OT protocol based on the garbled truth tables for the candidate gates corresponding to each logic gate by the server comprises obtaining the target garbled truth table of the i-th logic gate which is corresponding to the garbled truth table of a j-th type candidate gate through a decrypting process by using OT protocol, the j-th type candidate gate has the same type of gate with the i-th logic gate, j is an integer between 1 and M.

11. The server according to claim 8, wherein each of the candidate gates has at least one input wire and an output wire, the garbled truth tables for the candidate gates corresponding to each logic gate are generated by providing at least one input-wire key corresponding to the at least one input wire of a particular candidate gate among the candidate gates and providing at least one output-wire key corresponding to the output wire of the particular candidate gate, and encrypting each row of a truth table of the particular candidate gate by encrypting the output-wire key with the at least one input-wire key.

12. The server according to claim 8, wherein the NN model is encrypted by transforming the NN model to binary values and transforming the binary values to key-type original model values according to the key codebooks;
  wherein the compiled NN model is generated by performing the garbled circuit code based on the key-type original model values to generate key-type compiled model values of the compiled NN model.

13. The server according to claim 8, wherein the processor is further configured to transmit the compiled NN model to the first electrical device;
  wherein the compiled NN model is decrypted according to the key codebooks by the first electrical device to generate a machine code, and the machine code is performed by the first electrical device.

14. The server according to claim 8, wherein the processor is further configured to transmit the compiled NN model to a second electrical device;
  wherein the compiled NN model is decrypted according to the key codebooks by the second electrical device to generate a machine code, and the machine code is performed by the second electrical device.

15. An electrical device for processing a neural network, comprising:
- a transmission circuit;
- a processor, configured to assist a server to transform an AI compiler code of an AI compiler to a garbled circuit code by performing following procedures:
  - receiving a circuit graph of a garbled circuit corresponding to the garbled circuit code from the server through the transmission circuit, the garbled circuit having a plurality of logic gates;
  - creating a plurality of key codebooks for a plurality of candidate gates corresponding to each logic gate;
  - generating a plurality of garbled truth tables for the candidate gates corresponding to each logic gate; and
  - transmitting the garbled truth tables for the candidate gates corresponding to each logic gate to the server through using OT protocol via the transmission circuit;
- wherein the processor is further configured to encrypt an NN model according to the key codebooks, a target garbled truth table of each logic gate is obtained through using OT protocol based on the garbled truth tables for the candidate gates corresponding to each logic gate by the server, and a compiled NN model of an encrypted NN model is generated according to the garbled circuit code with the target garbled truth table of each logic gate by the server.

16. The electrical device according to claim 15, wherein the candidate gates comprise at least one 1-input candidate gate and at least one 2-input candidate gate, the garbled truth tables comprises 1-input garbled truth tables and 2-input garbled truth tables, the at least one 1-input candidate gate comprises a buffer gate and an NOT gate, and the at least one 2-input candidate gate comprises an AND gate, an OR gate, an NAND gate, an NOR gate, an XOR gate, and an XNOR gate.

17. The electrical device according to claim 15, wherein the circuit graph of the garbled circuit is a numbered circuit graph, the numbered circuit graph has a plurality of graph gates assigned with numbers without indicating the type of the graph gates, the logic gates comprises a first logic gate to an N-th logic gate, the candidate gates have a first type candidate gate to an M-th type candidate gate, M and N are integers, the procedure of transmitting the garbled truth tables for the candidate gates corresponding to each logic gate to the server through using OT protocol via the transmission circuit comprises:
- receiving a request R(i) corresponding to an i-th logic gate of the logic gates from the server, wherein i is an integer between 1 and N; and
- transmitting the garbled truth table of the first type candidate gate, the garbled truth table of a second type candidate gate, . . . the garbled truth table of the M-th type candidate gate corresponding to the i-th logic gate to the server in response to the request R(i);
- wherein the target garbled truth table of each logic gate is obtained by obtaining the target garbled truth table of the i-th logic gate which is corresponding to the garbled truth table of a j-th type candidate gate by the server through a decrypting process by using OT protocol, the j-th type candidate gate has the same type of gate with the i-th logic gate, j is an integer between 1 and M.

18. The electrical device according to claim 15, wherein each of the candidate gates has at least one input wire and an output wire, the procedure of generating the garbled truth tables for the candidate gates corresponding to each logic gate comprises:
- for a particular candidate gate among the candidate gates, providing at least one input-wire key corresponding to the at least one input wire of the particular candidate gate, and providing at least one output-wire key corresponding to the output wire of the particular candidate gate; and
- encrypting each row of a truth table of the particular candidate gate by encrypting the output-wire key with the at least one input-wire key.

19. The electrical device according to claim 15, wherein the NN model is encrypted by transforming the NN model to binary values and transforming the binary values to key-type original model values according to the key codebooks, and the key-type original model values are sent to the server;
- wherein the compiled NN model of the encrypted NN model is generated by performing the garbled circuit code based on the key-type original model values to generate key-type compiled model values of the compiled NN model by the server.

20. The electrical device according to claim 15, the processor is further configured to decrypt the compiled NN model according to the key codebooks to generate a machine code, and perform the machine code.

* * * * *